United States Patent

Backers et al.

[15] 3,663,746

[45] May 16, 1972

[54] DECODER FOR DECODING THE CHROMINANCE SIGNAL OF A COLOR TELEVISION SIGNAL

[72] Inventors: Franciscus Theodorus Backers; Harry Leman Swaluw, both of Emmasingel, Eindhoven, Netherlands

[73] Assignee: U.S. Philips Corporation, New York, N.Y.

[22] Filed: Mar. 24, 1969

[21] Appl. No.: 809,705

[30] Foreign Application Priority Data

Apr. 4, 1968 Netherlands..........................6804788

[52] U.S. Cl...........................................178/5.4 S, 178/5.4 P

[51] Int. Cl...........................................................H04n 9/40

[58] Field of Search.............................178/5.4, 5.4 S, 5.4 P; 307/232; 329/145; 333/7, 18, 31

[56] References Cited

UNITED STATES PATENTS

| | | | |
|---|---|---|---|
| 3,134,850 | 5/1964 | Seeley | 178/5.4 |
| 3,267,211 | 8/1966 | Melchior | 178/5.4 S |
| 3,336,437 | 8/1967 | Brouard et al. | 178/5.4 S |
| 3,499,105 | 3/1970 | Hobbs | 178/5.4 P |
| 3,548,086 | 12/1970 | Van Gurp | 178/5.4 P |
| 3,555,174 | 1/1971 | Bruch | 178/5.4 S |

FOREIGN PATENTS OR APPLICATIONS

| | | | |
|---|---|---|---|
| 1,185,649 | 1/1965 | Germany | 178/5.4 P |

*Primary Examiner*—Robert L. Griffin
*Assistant Examiner*—John C. Martin
*Attorney*—Frank R. Trifari

[57] ABSTRACT

A decoder circuit for PAL and SECAM television signals which has two reflection type delay lines. A horizontal frequency switch alternately applies the chrominance signal to the delay lines. The switch may be a pair of diodes or transistors. Since each delay line is of the relecting type, it need only contain half of the delay line material normally required.

3 Claims, 3 Drawing Figures

INVENTORS
FRANCISCUS TH. BACKERS
HARRY L. SWALUW
BY

AGENT

Patented May 16, 1972 3,663,746

2 Sheets-Sheet 2

INVENTORS
FRANCISCUS TH. BACKERS
HARRY L. SWALUW
BY

AGENT

DECODER FOR DECODING THE CHROMINANCE SIGNAL OF A COLOR TELEVISION SIGNAL

The invention relates to a decoder for decoding the chrominance signal of a color television signal in which the color information is alternately; i.e. one of two kinds from line to line. The decoder includes a delay circuit having first and second delay lines each having an input and an output. The present chrominance signal is applied during one line period to the input of the first delay line and a delayed signal is derived from the output of the second delay line. Then the chrominance signal is applied during the following line period to the input of the second delay line and a delayed signal is derived from the output of the first delay line.

Decoders for receivers suitable for handling color television signals in which the color information is a different one of two kinds from line to line, generally include a delay circuit. For receivers employing a SECAM signal in which only part of the color information is present during each line period, this delay circuit is absolutely necessary in order to be able to have the complete color information for display available for each line period. A delay circuit is not necessary, for receivers employing a PAL signal, because the complete color information is present in the PAL signal during each line period. In decoders for such receivers use is, however, mostly made of a delay circuit to be able to compare the color information from successive line periods and hence to be able to compensate given transmission errors occurring in the received signal.

British Pat. No. 990.597 describes a decoder of the kind described in the preamble for use in a SECAM receiver. In this patent a decoder having a single delay line is, however, preferred.

It is an object of the invention to provide a decoder of the kind described in the preamble which does have two delay lines, but nevertheless need not be more expensive than a decoder having a single delay line.

To this end a decoder according to the invention of the kind described in the preamble is characterized in that the two mentioned delay lines are of the reflection type, the input of each delay line also being the output.

It has been found by the Applicant that when using two delay lines a great technical advantage is obtained. In most conventional types of delay lines an unwanted reflection of the signal written during the previous line period appears at the input of the delay line within a given line period. This unwanted signal is written together with the newly provided signal and produces a disturbing phenomenon upon display of the signal on a color display device which phenomenon becomes visible in SECAM color television receivers as a Moire pattern and in PAL color television receivers as a disturbing pattern of lines. As has been found by the Applicant this disturbing phenomenon is avoided when using two delay lines. In fact, during each line period a color information of only a specific kind is written and a possible cross-talk from the previous line period to the next one is greatly similar to the signal of the same kind to be written again so that the above-mentioned disturbing phenomena do not occur anymore in the display on a color display device.

Due to the step according to the invention it is obtained that the amount of material handled of the two delay lines combined need not be larger than that of a single delay line which was usual up till now. In the circuit arrangement according to the invention the number of inputs and outputs is equal to that in a decoder having a single delay line which was usual up till now while the geometry of two delay lines having a combined input and output may be much simpler than that of a single delay line having a separate input and an output.

With respect to a circuit arrangement having two delay lines each having a separate input and output, the saving of material and of inputs and outputs in a circuit arrangement according to the invention is of course still greater.

In order that the invention may be readily carried into effect, a few embodiments thereof will now be described in detail by way of example, with reference to the accompanying diagrammatic drawings, in which details which are not important for the understanding of the invention have been omitted.

FIG. 2 shows by way of a simplified diagram an embodiment of a SECAM decoder having a delay circuit according to the invention in which the difference in attenuation of the delayed and the undelayed signals is compensated for.

FIG. 3 shows by way of a simplified diagram an embodiment of a PAL decoder having a delay circuit according to the invention in which the difference in attenuation of the delayed and the undelayed signals is compensated for.

Figure 1:
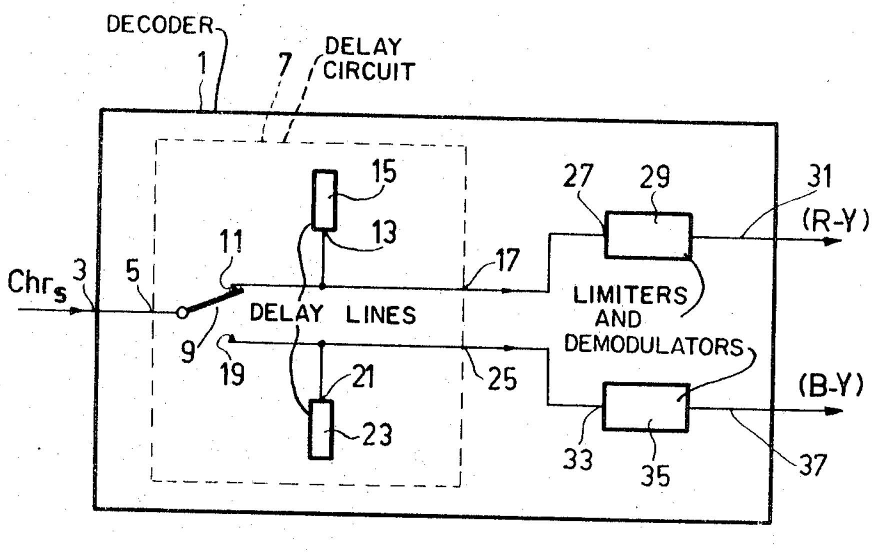
FIG. 1 shows by way of a simplified block diagram a SECAM decoder having a delay circuit according to the invention.

In FIG. 1 a decoder 1 has an input 3. A chrominance signal of the SECAM-type $Chr_s$ may be applied to this input 3 for the purpose of handling. The currently conventional SECAM chrominance signals contain alternately during one line period a red color difference signal modulated in frequency on a subcarrier and during the following line period a blue color difference signal modulated in frequency on a subcarrier.

The input 3 of the decoder 1 is connected through an input 5 of a delay circuit 7 comprising ultrasonic delay lines to a switch 9. The switch 9 may, for example, be operated in conventional manner by a switching signal originating from a receiver including the decoder 1. As a result the position of the switch 9 changes from line to line. In the position shown the switch 9 connects the input 5 to a contact 11. The contact 11 is connected to an input 13 of a delay line which, according to the invention, is of the reflection type; the input 13 is then also the output of this delay line.

Furthermore the input and output 13 is connected to an output 17 of delay circuit 7.

In the above-described position shown of the switch 9 the SECAM chrominance signal $Chr_s$ originating from the input 5 is directly passed on through the contact 11 of the switch to the output 17 and is also written in the delay line 15 through the input 13. This is the case during one entire line period. Assuming the modulated subcarrier of the red color difference signal to be present during this line period, this red color difference signal then appears at the output 17.

The switch 9 occupies a different position (not shown) during the following line period and the input 5 of the delay circuit 7 is connected to a contact 19 of the switch 9. This contact 19 is connected to an input 21 of a delay line 23. According to the invention the delay line 23 is also of the reflection type and the input 21 is also the output.

Furthermore the input and output 21 is connected to an output 25 of the delay circuit 7.

In the above-described position (not shown) of the switch 9, the SECAM chrominance signal $Chr_s$ originating from the input 5 is directly passed on through the contact 19 of the switch 9 to the output 25 and is also written in the delay line 23 through the input 21. During the line period that this is the case, the subcarrier modulated with the blue color difference signal is present. Consequently, the color subcarrier modulated with the blue color difference signal then appears at the output 25.

Meanwhile the red color difference signal written in the delay line 15 during the previous line period has again become available at the input and output 13 and is passed on to the output 17 of the delay circuit 7.

To this end the delay line 15 must have a length such that the derived signal has undergone a delay of exactly one line period relative to the written signal. The length of the delay line 15 may thus be half that of a delay line having a separate input and output and the same delay time, or the width of the delay line 15 may at least be reduced by 50 percent relative to a delay line of a reflection type having a separate input and output.

The following line period the switch 9 again occupies the first-mentioned position and an undelayed red color difference signal again appears at the output 17.

Consequently, an undelayed and a red color difference signal delayed by one line period and modulated on a color subcarrier then alternately appear at this output 17.

Meanwhile the blue color difference signal written in the delay line 23 during the previous line period again becomes available at the input and output 21 and hence at the output 25.

Consequently, a delayed and an undelayed blue color difference signal modulated on a color subcarrier are alternately present at this output 25.

The output 17 is connected to an input 27 of a limiter and demodulator device 29 in which the subcarrier signal of the red color difference signal modulation is further handled and becomes available in demodulated form at an output 31.

Accordingly the output 25 is connected to an input 33 of a limiter and demodulator device 35 for the blue color difference modulation. Thus a modulated blue color difference signal becomes available at an output 37 during each line period.

As regards the dimensions of the delay line 23 the same remarks apply as to those of the delay line 15. The delay lines 15 and 23 combined thus require at most the amount of material for a single delay line as it is commonly used in conventional circuits. The number of inputs and outputs is furthermore equal to the number which must be used in a delay circuit having a single delay line, so that the cost of two half lines of the reflection type as are used according to the invention need not be higher than when using a single delay line which was usual up till now.

In the circuit arrangement according to the invention there is the advantage that a color difference signal of the same kind (blue or red) is always handled during each line, so that parasitic reflections, which may occur after a number of line periods, are not disturbing.

In the embodiment described a single switch 9 is used, which in most cases will be satisfactory for SECAM receivers having satisfactory limiter devices. In fact, it must be possible for the limiter devices to handle signals showing an amplitude difference from line to line which corresponds to the attenuation of a signal delayed in a delay line 15 or 23 relative to an undelayed signal which is directly passed on.

Figure 2:
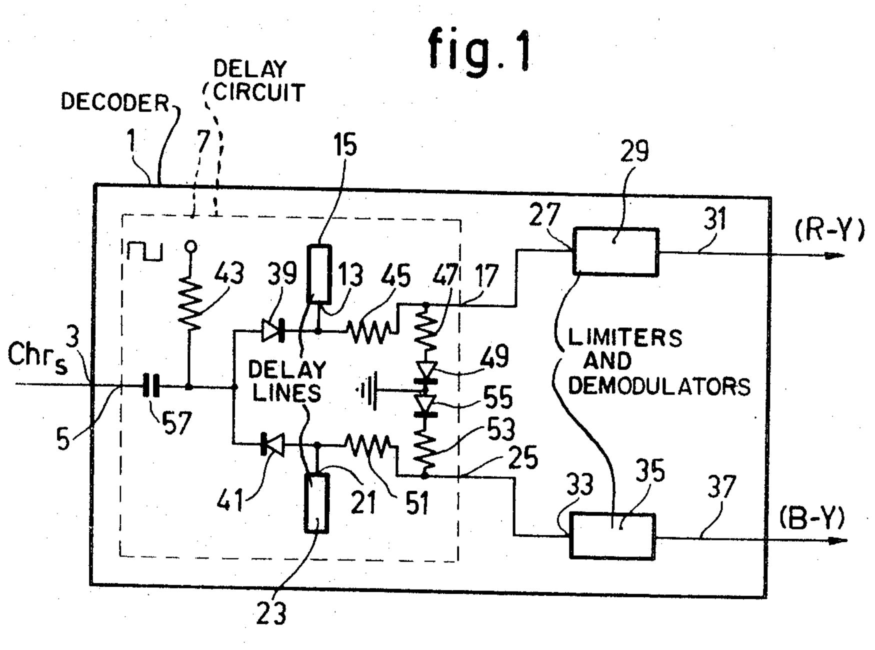

If this is experienced as a drawback, it is possible to use a circuit arrangement as shown in the embodiment of FIG. 2.

In FIG. 2 corresponding parts have the same reference numerals as those in FIG. 1. For the description of their operation reference is therefore made to the corresponding description of the embodiment of FIG. 1. As regards the structure of the delay circuit 7, the embodiment of FIG. 2 differs from that of FIG. 1 in that the switch 9 is shown in greater detail and is formed with two diodes 39 and 41 which are operated by a square-wave voltage applied through a resistor 43. Furthermore, devices having a switchable transmission factor are provided between the input and output 13 of the delay line 15 and the output 17 of the delay circuit 7, and between the input and output 21 of the delay line 23 and the output 25 of the delay circuit 7. These devices include a series arrangement of a resistor 45, a resistor 47 and a diode 49 and a series arrangement of a resistor 51, a resistor 53 and a diode 55, respectively. The cathodes and anodes of the diodes 49 and 55, respectively, are connected to ground.

The outputs 17 and 25 are of the delay circuit 7 are connected to the connections of the resistors 45 and 47 and 51 and 53, respectively. The inputs and outputs 13 and 21 of the delay lines 15 and 23 are connected to the cathode of the diode 39 and one end of the resistor 45, and to the anode of the diode 51 and one end of the resistor 51, respectively.

The input 5 of the delay circuit 7 is connected through a capacitor 57 to the anode of the diode 39, to the cathode of the diode 41 and to one end of the resistor 43.

The operation of the delay circuit 7 is as follows:

Assuming the square-wave voltage applied to the resistor 43 to the positive, a current will start to flow to ground through the resistor 43, the diode 39, the resistor 45, the resistor 47 and the diode 49. The voltage at the anode of the diode 39 will then become positive and the diodes 41 and 55 will remain blocked.

The diodes 39 and 49 are then conducting and will have a small AC resistance. A SECAM chrominance signal $Chr_s$ applied to the input 5 will appear substantially unattenuated at the input 13 of the delay line 15 through the capacitor 57 and the diode 39.

Since the diode 49 is conducting, the series arrangement of resistor 45, resistor 47 and diode 49 forms an attenuator and the signal $Chr_s$ applied to the input 13 of the delay line 15 appears attenuated at the output 17 of the delay circuit 7.

Simultaneously, a signal written during the previous line period appears at the output 21 of the delay line 23, which signal is applied through the resistor 51 to the output 25 of the delay circuit 7. This signal is substantially not attenuated.

During the following line period the square-wave voltage applied to the resistor 25 is negative. The diodes 39 and 49 are then blocked and the diodes 41 and 55 are conducting.

An unattenuated signal is then written in the delay line 23, and an attenuated undelayed signal is applied to the output 25. A delayed signal appears at the output 17 through the resistor 45 and originating from the input and output 13 of the delay line 15, which signal is substantially unattenuated as a result of the blocked condition of the diode 49.

Since the signal written in the delay line 15 during the previous line period and now appearing at the output 17 has experienced a given attenuation in that delay line, it is possible, by correct choice of the resistors 45 and 47, to render the amplitudes of comparable signals in two successive line periods equal to each other at the output 17. The same applies of course to the signals in two successive line periods at the output 25 of the delay circuit 7 in case of correct choice of the resistors 51 and 53.

The influence of the attenuation of the delay lines 15 and 23 is thus eliminated and it is no longer necessary to impose strict requirements upon the limiters in the limiter and demodulator devices 29 and 35.

Figure 3:
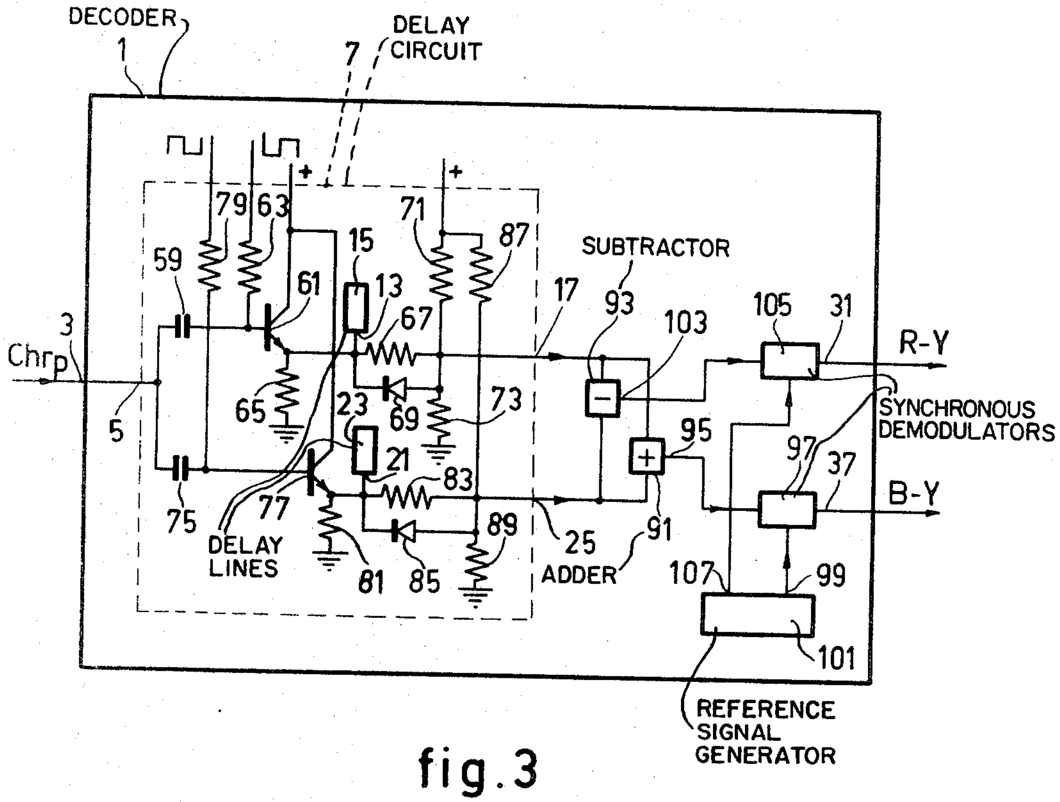

In FIG. 3 corresponding parts have the same reference numerals as those in FIG. 1 and for their description reference is therefore made to the description of FIG. 1.

The differences with the decoder of FIG. 2 are the following:

A PAL chrominance signal $Chr_p$ instead of a SECAM chrominance signal is now applied to the inputs 3 and 5. Furthermore the delay circuit 7 includes a circuit for the elimination of the attenuation between delayed and undelayed signals as occur at the outputs 17 and 25 of FIG. 1. The further signal handling from the outputs 17 and 25 to the outputs 31 and 37 is of course adapted to the method of handling required for a PAL signal.

The delay circuit 7 will now be described first.

The input 5 of the delay circuit 7 is connected through a capacitor 59 to the base of a transistor 61. A square-wave voltage which has a different polarity from line to line is applied to this base through a resistor 63. Transistor 61 is switched as an emitter follower. Its collector is connected to a positive supply voltage and its emitter is connected to ground through a resistor 65. The emitter is furthermore connected to the input and output 13 of the delay line 15, to a resistor 67 and to the cathode of a diode 69. The other end of the resistor 67 and the anode of the diode 69 are connected to a tap on a potential divider and are furthermore connected to the output 17 of the delay circuit 7. This potential divider is formed by a series arrangement of resistors 71 and 73 between a positive supply voltage and ground.

Furthermore the input 5 of the delay circuit 7 is connected through a capacitor 75 to the base of a transistor 77. A square-wave voltage is applied to this base through a resistor 79, said voltage having a polarity opposite to that of the square-wave voltage supplied to the base of the transistor 61. As a result the transistor 77 is conducting when the transistor 61 is cut off and conversely. Transistor 77 is switched as an emitter follower. The collector of this transistor 77 is connected to a positive supply voltage. The emitter is connected to earth through a resistor 81. Furthermore the emitter is connected to a resistor 83 and the cathode of a diode 85. The other end of the resistor 83 and the anode of the diode 85 are connected to a tap on a potential divider and to the output 25 of the delay circuit 7. The last-mentioned potential divider is formed by a series arrangement of two resistors 87 and 89 between a positive supply voltage and ground.

The operation of the delay circuit 7 is as follows:

It is assumed that the transistor 77 conducts as a result of a positive voltage applied to its base through the resistor 79. The PAL chrominance signal $Chr_p$ applied through the input 5 and the capacitor 75 is passed on from the base of the transistor 77 to the emitter and hence to the input 21 of the delay line 23.

Furthermore the PAL chrominance signal is passed on through the resistor 83 to the tap on the potential divider 87, 89 and the output 25. The diode 85 does not conduct because the positive voltage across its anode is lower than that across its cathode and the PAL chrominance signal originating from the emitter of the transistor 77 is passed on to the output 25 in an attenuated form as a result of the attenuation of the network of the resistors 83, 87, 89.

Simultaneously, transistor 61 is cut off and no positive voltage is produced across the emitter of this transistor as a result of the absence of transistor current. The diode 69 will now conduct and the input and output 13 of the delay line 15 is connected through the low AC-resistance of the diode 69 to the output 17. The PAL signal written in the delay line 15 during the previous line period then appears at said output.

During the following line period the polarity of the square-wave voltages across the resistors 63 and 79 is reversed and the transistor 61 conducts and the transistor 77 is cut off. As a result the diode 85 conducts and the diode 69 is blocked. An attenuated undelayed PAL signal then occurs at the output 17 and a delayed PAL signal occurs at the output 25 which signal is passed on substantially unattenuated from the input and output 21 of the delay line 23 to the output 25. The amplitude of the last-mentioned signal has, however, undergone an attenuation determined by the delay line 23 relative to the amplitude written during the previous line period. Due to the operation described above an undelayed PAL-signal and a PAL-signal which is delayed by one line period is alternately obtained at the output 17 or 25, the amplitude of the delayed signal being equal to that of the corresponding undelayed signal by correct choice of the resistors 67, 73 and 83, 89.

The structure and operation of the remaining parts of the decoder 1 is as follows:

The signals originating from the outputs 17 and 25 of the delay circuit 7, are applied to an adder 91 and a subtractor 93. An output 95 of the adder 91 is connected to an input of a synchronous demodulator 97. A further input of the synchronous demodulator 97 is connected to an output 99 of a reference signal generator 101. An output 103 of the subtractor 93 is connected to an input of a synchronous demodulator 105. A further input of the synchronous demodulator 105 is connected to an output 107 of the reference signal generator 101. A blue color difference signal is obtained from the output 95 of the adder 91 and a red color difference signal is obtained from the output 103 of the subtractor 93 which signals are demodulated in the synchronous demodulators 97 and 105 and appear at the outputs 37 and 31.

In a decoder according to the invention formed in such a manner, it is not necessary for either the phase of the reference signal or that of the signal to be demodulated and applied to the red color difference signal demodulator 105 to be shifted 180° in phase from line to line as is common practice for the decoders known up till now. This will be evident as follows.

The PAL signal $Chr_p$ has the shape $U+jV$ during one line and the shape $U-jV$ during the other line.

It is assumed that the signal has the shape $U+jV$ at the input 5. It is furthermore assumed that the transistor 61 is conducting and the transistor 77 is cut off. A signal $k(U+jV)$ is then produced at the output 17, $k$ representing the attenuation of the circuit between the input 5 and the output 17. The signal of the shape $k(U-jV)$ which was written in the delay line 23 during the previous line period then appears at the output 25.

The following line period the signal at the input 5 has the shape $U-jV$. The transistor 77 is then conducting and the transistor 61 cut off. The signal at the output 25 is then directly passed on and has the shape $k(U-jV)$. The signal of the shape $k(U+jV)$ reproduced by the delay line 15 and delayed by one line period, then appears at the output 17.

It is evident from this consideration that a signal of the shape $k(U+jV)$ always appears at the output 17, and a signal of the shape $k(U-jV)$ always appears at the output 25. This results in a signal of the shape $2kU$ at the output 95 of the adder 91 and in a signal of the shape $2kjV$ at the output 103 of the subtractor 93, which signal thus does not show a change of polarity.

In this embodiment the inputs and outputs of the delay lines and the inputs of the attenuators which can be switched are connected to the emitters of the transistors 61 and 77 serving as an output electrodes. In certain cases it may be advantageous to connect them in the collectors of the said transistors and to utilize these collectors as output electrodes.

It will be evident that the structure of the delay circuit 7 of FIGS. 2 and 3 is independent of the type of chrominance signal to be handled. Both embodiments of the delay circuits may therefore be interchanged.

Furthermore it will be evident to those skilled in the art that the time-dependent attenuations used in the circuit arrangements of FIGS. 2 and 3 may alternatively be performed in different manners and may further be used as, for example, time-dependent amplifications while, for example, the demodulators may be omitted in certain decoders without passing beyond the scope of the present invention.

What is claimed is:

1. In a circuit for decoding chrominance signals of a color television signal including first and second reflection type delay lines having first and second input-output terminals respectively, switching means responsive to a switching signal for alternately applying said chrominance signals to said delay lines at the line frequency of said television signal, first and second decoder output terminals, and first and second variable impedance networks coupled between said delay line input-output terminals and said decoder output terminals and responsive to said switching signals for alternately attenuating the signals applied to said first and second decoder output terminals, the total electrical length of each delay line corresponding to the period of said line frequency of said television signal whereby at any instant in time an attenuated portion of said chrominance signal is provided at one of said first and second decoder circuit output terminals from said decoder input terminal, and an unattenuated delayed portion of said chrominance signal is provided at the other of said first and second decoder circuit output terminals from one of said delay lines.

2. A circuit as claimed in claim 1 wherein said variable impedance means comprises a diode-resistor circuit, means for biasing one end of each of said impedance means and means for applying switching signals to the other end of said impedance means.

3. A circuit as claimed in claim 1 wherein said switching signal applying means comprises a plurality of transistors, said transistors having bases coupled to said decoder input terminal and emitters coupled to said impedance means.

* * * * *